United States Patent [19]

Wills

[11] Patent Number: 4,690,295

[45] Date of Patent: Sep. 1, 1987

[54] PRESSURE CONTAINER WITH THERMOPLASTIC FUSIBLE PLUG

[75] Inventor: Anthony J. Wills, Clevedon, England

[73] Assignee: The British Petroleum Company P.L.C., London, England

[21] Appl. No.: 744,819

[22] PCT Filed: Nov. 8, 1984

[86] PCT No.: PCT/GB84/00383

§ 371 Date: Jun. 10, 1985

§ 102(e) Date: Jun. 10, 1985

[87] PCT Pub. No.: WO85/02243

PCT Pub. Date: May 23, 1985

[30] Foreign Application Priority Data

Nov. 9, 1983 [GB] United Kingdom ............... 8329905

[51] Int. Cl.$^4$ .................. B65D 25/00; F25J 00/00
[52] U.S. Cl. ................................. 220/207; 220/3; 220/89 B
[58] Field of Search ............. 220/202, 207, 240, 414, 220/465, 3, 88 R, 89 B, 457; 138/26, 30

[56] References Cited

U.S. PATENT DOCUMENTS

| 3,137,405 | 6/1964 | Gorcey ........................... 220/414 X |
| 3,266,660 | 8/1966 | Ragettli ........................... 220/414 |
| 3,334,780 | 8/1967 | Van Leer et al. . | |
| 3,356,257 | 12/1967 | Eimer ............................. 220/89 B |
| 3,449,182 | 6/1969 | Wiltshire ........................... 220/3 |
| 3,776,412 | 12/1973 | Mink ............................. 220/3 X |
| 3,840,139 | 10/1974 | Harmon ........................... 220/3 |
| 3,907,149 | 9/1975 | Harmon ........................... 220/3 |
| 3,908,851 | 9/1975 | Jacobs ........................... 220/3 |
| 4,085,860 | 4/1978 | Hawkins et al. ............. 220/89 B |
| 4,147,272 | 4/1979 | Stenner et al. ............. 220/89 B |

FOREIGN PATENT DOCUMENTS

| 1272354 | 10/1960 | France . | |
| 2352231 | 12/1977 | France . | |
| 995684 | 6/1965 | United Kingdom . | |
| 275460 | 11/1965 | United Kingdom ............. 220/3 |
| 1023011 | 3/1966 | United Kingdom . | |

Primary Examiner—Stephen Marcus
Assistant Examiner—Bryon Gehman
Attorney, Agent, or Firm—Brooks Haidt Haffner & Delahunty

[57] ABSTRACT

A container for the storage and transportation of pressurized fluids is provided comprising a thermoplastic inner liner which is stable and impervious to the fluid to be contained therein up to a predetermined temperature but is fluid-pervious above the temperature, a fusible plug portion and an outer layer of an insulating fire resistant material encasing the inner liner but exposing the fusible plug portion.

17 Claims, 1 Drawing Figure

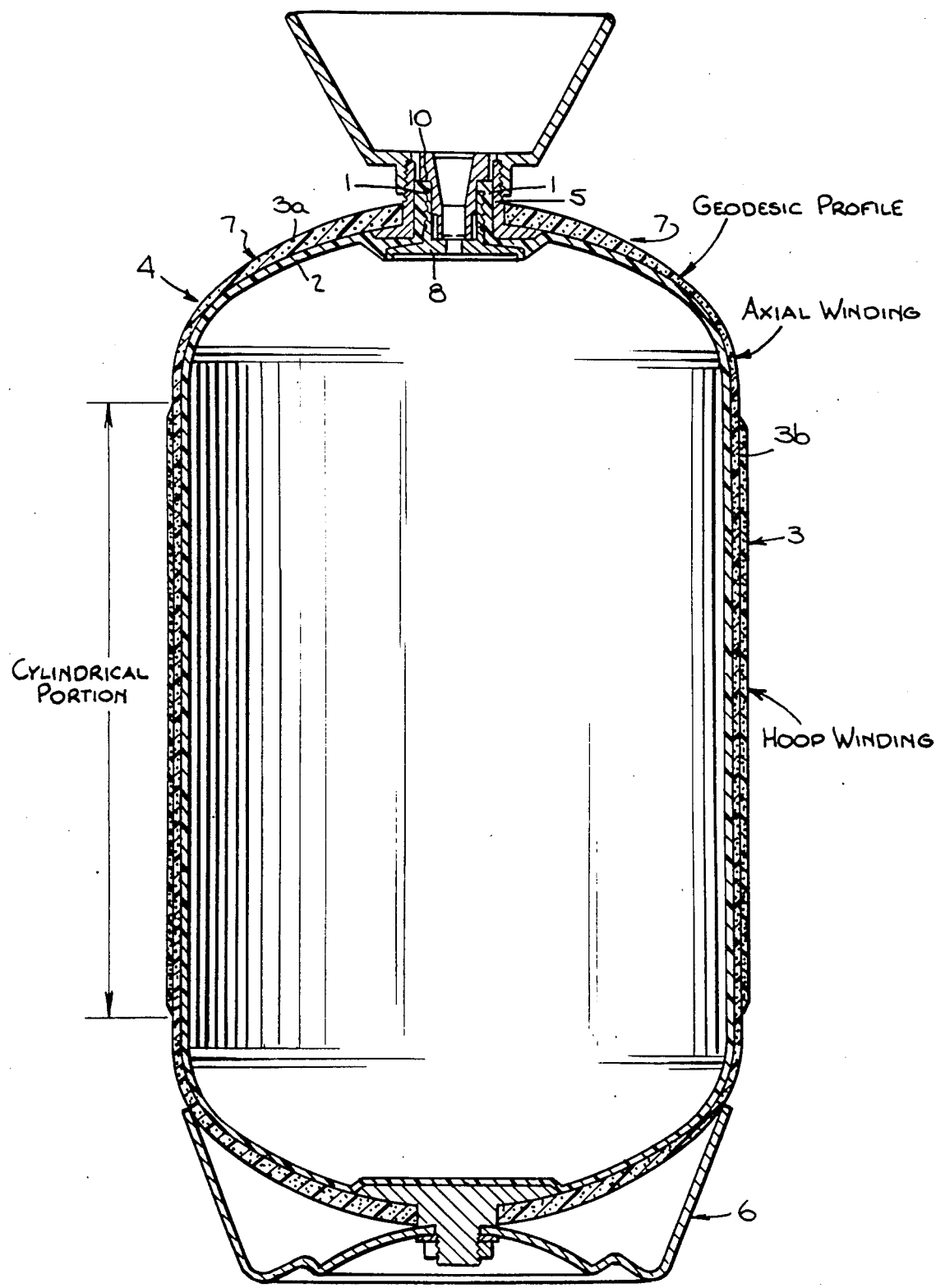

PRESSURE CONTAINER WITH THERMOPLASTIC FUSIBLE PLUG

The present invention relates to a container for pressurised fluids and in particular to containers which minimise the risks arising from sudden increases in internal pressure.

Fluids such as liquefied petroleum gas (LPG) are marketed in a range of portable containers for domestic use e.g. cooking, heating and lighting. Such containers have hitherto been made from steel, aluminium or alloys thereof. The containers generally have a dome at one end and a dispensing nozzle at the other end. The dispensing nozzle is conventionally attached to a relief valve to safeguard against sudden increases in internal pressure. One of the major disadvantages of containers of this type is that they are prone to catastrophic failure when exposed to excessive heat e.g. when especially when engulfed by fire. That is, the container either explodes, spilling the contents or, if the relief valve comes into operation, a high pressure jet of the fluid emerges from the valve which can ignite and increase the intensity of the fire considerably.

UK Patent Publication Specification Nos. 995684 and 1204503 describe explosion-proof pressure vessels which have a porous outer and inner wall, the inner wall being provided with a lining of a polyester type material which is impervious over a specific temperature range but becomes gas pervious above that range allowing the contents of the vessel to diffuse through the outer walls slowly. In this manner the risk of explosion due to internal pressure build-up upon exposure to excessive heat is prevented. However, the manufacture of the vessel requires complicated means of applying internal coatings and the vessel needs to have at least an external wall which is porous to the fluid stored under pressure.

It is an object of the present invention to minimise the risks involved in storing potentially hazardous fluids especially in a domestic environment.

Accordingly, the present invention is a container for the storage and transportation of pressurized fluids comprising:
- a thermoplastic inner liner which is stable and impervious to the fluid to be contained therein up to a predetermined temperature but is fluid-pervious above the temperature,
- a fusible plug portion and
- an outer layer of an insulating fire resistant material encasing the inner liner but exposing the flusible plug portion.

In a still further embodiment of this invention, the container is cylindrical and is provided with a neck portion adapted to receive a discharge nozzle, the neck portion being integral with the inner liner and forming the exposed fusible plug portion. Preferably, the neck portion will also contain a relief valve.

According to a further embodiment, the present invention is a cylindrical container for the storage and transportation of pressurised fluids comprising a thermoplastic inner liner which is stable and impervious to the fluid to be contained therein up to a predetermined temperature range but is fluid-pervious above the temperature and a outer layer of an insulating fire resistant material encasing said inner liner, characterised in that
(a) the inner liner is blow-moulded or rotational-moulded and incorporates a fusible plug portion,
(b) the outer layer is formed on the inner liner in a manner to expose the fusible plug portion, and
(c) the outer layer comprises at least two sets of glass fibre reinforced fibrous windings substantially covering the surface of the inner liner, a first axial set wound in planes substantially parallel to or at a slight angle to the axis of the inner liner and a second hoop set wound circumferentially in planes substantially normal to said axis of the inner liner, the second hoop set overlying the first axial set at least along the cylindrical portion of the inner liner.

An embodiment of the invention is illustrated in the single FIGURE of the drawing which is an axial section of the container of the invention.

An essential feature of the present invention is the exposed plug portion 1 which is part of the inner liner 2 but is not covered by the insulating outer layer 3. By "exposed" is meant that the fusible plug portion 1 is not covered by the outer layer of insulating fire resistant material. In this manner, the exposed fusible plug portion is first affected by any excessive heat in the environment and provides an escape for pressure build-up. By choosing a thermoplastic inner liner 2 having the correct thermal stability for the environment to which the container is likely to be exposed, it can be ensured that the effect of excessive heat will be first to melt or render porous the fusible plug portion 1 in the container 4 thereby allowing release of pressure and preventing the risk of explosion. In view of the fact that the plug portion 1 is not a conventional relief valve and that it will become porous at much lower pressures than the threshold pressures for a relief valve at a given temperature, there will be no risk of valve blow-out which can be the cause of flame-throwing upon fire engulfment. The remainder of the inner liner 2 will be substantially intact due to the effect of the insulating outer layer 3.

The exposed fusible plug portion may be on any part of the container but is preferably at one of the dome ends (or polar points) in a container 4 of cylindrical shape. The plug portion is preferably integral with the container.

In a preferred embodiment wherein the fusible plug portion is the neck portion of cylindrical container, the fusible plug portion will have a protective collar 5 to provide mechanical support. The protective collar 5 partially covers the fusible plug portion (neck portion) allowing heat to penetrate to the fusible plug portion 1 between the collar 5 and the fitting 9, described hereinafter, and the internal fluid to pass from the fusible plug portion 1 once it is rendered porous.

The protective collar 5 should be made of a high thermally conductive material such as a conductive metal. It is placed on the outer circumferential portion 1 of the fusible plug portion (neck portion) and does not stop the pressurised fluid from passing through the fusible plug portion 1 once the plug has melted. The collar 5 does not entirely cover the fusible plug portion 1 leaving a portion of the fusible plug portion uncovered. When the protective collar is employed, it is partially covered and held in place by the outer layer 3.

The thermoplastic polymeric material used to form the inner liner 2 may suitably be selected from polyethylene terephthalate, high density or low density polyethylene, polypropylene, polyvinyl chloride, polyvinylidene chloride and the like. The polymeric material chosen will depend on the threshold temperature desired, the fluid to be stored and the environment to which the container is likely to be exposed. The inner liner 2 is suitably of a thickness ranging from 0.5–6.0 mm, preferably 1.0–3.0 mm. The inner liner 2 is preferably blow-moulded or rotational-moulded from the appropriate thermoplastic polymer to the desired thickness. Polymeric materials with a threshold temperature of 300° C. are preferred.

The insulating outer layer 3 may be any material thermally stable to the desired temperatures. For example, the insulating outer layer 3 is a structural fibre such as a carbon fibre, a polyamide fibre, a glass fibre, a glass reinforced polyester fibre, a glass reinforced phenolic fibre, a glass reinforced epoxy resin or the like.

In the case of a cylindrical container, the insulating outer layer 3 may be a filament wound around the inner liner 2 either axially or circumferentially or both, or may be wrapped on the inner liner 2 in the form of a mat made of one or more layers of chopped strands of fibre. The insulating outer layer 3 may also include an adhesive resin material such as an epoxy resin which will retain the insulating outer layer on the thermoplastic inner liner. To form the insulating outer layer 3, it is preferable to arrange a first set 3a of axial fibres wound at a slight degree angle to the longitudinal axis of the inner liner and then overlay a second set 3b of hoop fibres circumferentially along the cylindrical length of the inner liner. The axial winding angle is chosen based upon the ratio of the port opening diameter to the cylinder diameter. The axial windings are placed around the port opening with as little deviation or angle from the longitudinal axis as possible. Generally, the axial windings should not be more than 20 degrees from the longitudinal axis, preferably not more than 16 degrees.

Containers having this type of insulating outer layer 3 have the further advantage in that it is possible to detect at an early stage the build-up of internal pressure because the hoop windings 3b tend to peel-off or unwrap under excessive pressure. The weight ratio of axial windings 3a to hoop windings 3b is critical for a given threshold value of internal pressure. By selecting the proper ratio, the hoop windings 3b begin to peel as the pressure builds giving a visual warning of increasing pressure.

The hoop to axial fibre weight ratio in the insulating outer layer is suitably from 0.5:1 to 2:1, preferably 1:1 to 1.7:1, most preferably from 1.2:1 to 1.6:1 to ensure a "safe" failure mode by the hoop windings unwrapping. It is therefore possible to take corrective action before a catastrophic failure occurs. The thickness of the insulating outer layer 3 may vary widely but for convenience is from 2.0–5.5 mm depending upon the degree of robustness and insulating property desired.

The insulating effect of the insulating outer layer 3 is also enhanced by the charring effect of heat on the outer layer thereby minimising heat transfer to the contents of the container.

The container 4 may be optionally provided with a conventional foot or base 6 ring to impart stability and to aid stacking.

The present invention is further illustrated with reference to the following tests.

(A) CONTAINER FABRICATION

The fabrication process was in two stages; firstly a cylindrical inner liner (minimum thickness 2.0 mm) was blow-moulded from Rigidex (Regd. Trade Mark) Grade 55CR-2 high density polyethylene (HDPE), and this then became the mandrel for the second stage, during which the inner liner was encased with a fibrous insulating outer layer by a filament winding technique (wave winding). The inner liners 2 to be encased in the insulating outer layer 3 all had a specified nominal wall thickness of 3.0 mm. This was in fact the minimum wall thickness, as the thickness increased around the shoulders 7 of the blow-moulding. A conventional aluminium boss 8 was incorporated in the neck of the liner 2 during blow-moulding. This boss 8 was threaded to accept a conventional second aluminium fitting 9 from outside the inner liner which incorporated a gas tight seal 10 (Viton 'O' ring) and a standard tapered valve thread (not shown) to enable a standard LPG cylinder valve to be screwed into this fitting.

Three nominal composite wall thicknesses were chosen, these being 2.0, 3.5 and 5.0 mm. This covered the range of values previously calculated which meet the pressure requirement of the LPG cylinder, according to the relevant standards.

Several containers 4 each encased in an insulating outer layer 3 were fabricated. In each case, the inner liners 2 were stabilised (pre-shrunk) by thermal treatment at 80° C. for 4 hours prior to encasing. The lay-up structure consisted of a set 3a of axial fibres laid down around the dome ends (actual winding angle of ±8° to long axis of the cylindrical inner liner) followed by a set 3b of hoop fibres along the cylindrical section. The number of layers of fibres used in each direction varied with the total wall thickness required.

Full details of the glass fibre type, resin system, curing schedules and the dimensions of the composite prototype cylindrical containers are given below.

(i) Glass Fibre

Pilkingtons Equerove ® 20/43 600 tex bi-compatible (sized for both epoxy and polyester resins).

(ii) Resin Systems (a)
Polyester—BPCL Cellobond ® A283/270
Catalysts—MER peroxide (2 percent), Accelerator E (Coablt naphthenate in styrene, 1 percent).

(b)
Epoxy—Shell 828
Catalyst—Ancamine D ® (23 parts to 100 parts resin by weight).
Cure schedule—Gelation at room temperature overnight followed by 24 h at 80° C.

(c)
Phenolic—BPCL J2018
Catalyst—Phencat ® 11 (4 percent by weight)
Cure schedule—Room temperature gelation overnight,

Insulating outer layer structure

The insulating outer layer structure consisted of two parts:
(a) Axial windings around dome ends (actually at ±8° to long axis of cylinder).
(b) Hoop windings (90° to long axis) along the cylindrical portion.

The number of layers of hoop and axial fibres increase from 4:2 from the 2.0 mm wall thickness, to 6:4 for the 3.5 mm and to 10:6 for the 5.0 mm.

Filament Winding Times

Using a wave winding technique, approximate fabrication times for each wall thickness were:
2.0 mm—2 hours, 3.5 mm—3 hours,
5.0 mm—minimum 4 hours.

Dimensions

Each container was 486 mm long and had a diameter (cylindrical section) 292 mm.

Details of the cylinder weights, lay-up structure and thicknesses are given in Tables 1 and 2.

In all the containers, the exposed fusible plug portion not covered by the insulating outer layer was the neck of the container.

The containers so produced were subjected to the following tests.

(B) SAFETY—FIRE ENGULFMENT TESTS

One of the major hazards associated with LPG cylinders is their behaviour in fire engulfment situations.

Comparative fire tests were undertaken on composite cylinders (one of each wall thickness, 2.0, 3.5 and 5.0 mm), aluminium and steel bottles. A gas oil pool fire was used. The containers were suspended a few inches above the gas-oil liquid level. Weight loss and pressure measurements were made during the test.

A summary of the results from the fire engulfment tests is given in Table 3. With reference to Table 3 the following points are significant:

(a) Composite cylinders did not vent through the pressure relief valve. The pressures are much lower than observed with metallic bottles, being between 4.8 and 8.5 bar. (The PRV setting was 24 bar.) Pressures also rose much more gradually in this type of cylinder. An inherent 'fail safe' mechanism operated.

(b) Aluminium bottles vented violently after 1.5 min. The pressure relief valve could not cope with the release rate and an explosion occurred after 1.95 min.

(c) Steel bottles vented violently after 1.83 min, and continued to vent for about 7 min until empty.

The fireball from the exploding aluminium bottles was estimated to be 8 m wide and the top of the bottle was found 20 m away. The venting of the steel bottle was apparent with a significant increase in the intensity of the fire environment. The composite cylinder released the gas very gradually and there was little increase in fire environment intensity.

After completion of the fire tests, the steel bottle was found to be intact, but only the foot of the aluminium bottle remained. In the case of the composite cylinders, the resin had been burnt off, leaving an intact glass fibre structure. The top dome had collapsed inwards at the fusible plug portion, probably caused by a combination of partial vacuum effect due to gas expulsion and HDPE inner liner melting and collapse.

The fire engulfment tests showed that composite LPG cylinders are much safer than either aluminium or steel. The composite cylinder design incorporated an 'in built' safety mechanism in the form of a fusible plug portion which removes the need for a pressure relief valve. Because the composite cylinder is a better thermal insulant than steel or aluminium, heat transfer rates are lower and the pressure build-up is much slower. A resin charring process also occurred which minimised heat transfer rates. The time to reach maximum pressure rose as the wall thickness increased. The 'fail safe' mechanism occurred because the HDPE inner liner neck in the form of a fusible plug portion melted and collapsed, allowing gas to gradually bleed off.

(C) BURST PRESSURE TESTING

In a burst pressure test programme, composite prototypes of different materials were tested. For comparison conventional LPG bottles, made from aluminium and steel were pressure tested. The results are shown in Table 4.

1. Composite Cylinder Prototype Testing

The composite cylinders (3 mm thickness) fabricated as in Section A above according to the present invention were stable up to 1380 psi.

2. Pressure Testing of Aluminium and Steel Bottles (comparative Test not according to the invention)

An aluminium bottle (3 mm thickness, manufactured by Grundy) failed at a pressure of 7.59 MPa (1100 psi). Failure occurred by a longitudinal split which originated at the overlap of the weld bead in the centre of the cylindrical section. A failure pressure of 7.70 MPa (1116 psi) has been cited by Grundy.

A steel bottle (3-4 mm thickness Shell Butagas (Regd Trade Mark)) could not be pressure tested to failure. A maximum pressure of 8.97 MPa (1300 psi) was achieved. The bottle had undergone extensive plastic deformation and ballooned outwards as a result of the internal pressure.

D. FLOW RATE MEASUREMENTS

Composite cylinder prototypes (one of each nominal wall thickness, 2.0, 3.5 and 5.0 mm) fabricated as in Section A above were filled with 99 percent pure n-butane from a 47 kg cylinder with a liquid feed. Liquid levels could be easily observed through the translucent wall even with the 5.0 mm thick cylinder. This has advantages where filling stations cannot accurately monitor filling ratios in the conventional opaque containers.

The aims of the flow rate measurements were to establish that a composite LPG cylinder can maintain vapour pressure and hence flow rates by heat transfer through the cylinder walls to vapourise the LPG. Comparative tests were carried out on both composite and steel cylinders. Compared to steel or aluminium, composites cylinders are thermal insulators.

The tests were performed in two ways:

(a) Ability to maintain Maximum Flow Rates

The length of time composite and steel cylinders could maintain a given maximum flow rate was measured. The flow rate chosen was 5 liter/min. This is equivalent to the maximum continuous rating Color Gas give their 15 kg steel bottles and about 3× the flow rate required for a 4 kW domestic heater. The composite cylinders sustained this flow rate for approximately 8 h. There appeared to be little effect of composite wall thickness. The steel bottle sustained this flow rate for approximately twice as long although the steel bottle contained a n-butane/iso-butane mixture with a boiling point of about −5° C., whereas the composite cylinder contained 99 percent n-butane with a boiling point of −0.5° C. The vapor pressures of the two hydrocarbons at a given temperature would be significantly different. These measurements were also performed when ambient temperatures were about 25° C.

A second series of measurements were performed with the LPG bottles at low temperatures because these would be required for use during winter when ambient temperatures are much lower.

(b) Ability to run a Domestic Space Heater

Composite cylinder and steel bottles were placed in an environmental chamber at low ambient temperatures and their ability to continuously run a 4 kW domestic space heater monitored. With a full composite cylinder at 5° C. the heater ran continuously all day (6.5 hours) without any flow rate problems. A composite cylinder, only one third full, was then monitored at 5° C. The 4 kW heater was run for 1 hours. A steel bottle containing an equivalent amount of n-butane lasted for about 2 hours at the same temperature.

The flow rate measurements indicated that composite LPG cylinders work even at ambient temperatures as low as 5° C. As the liquid level falls the heat transfer becomes more inefficient.

TABLE 3

| Bottle/Cylinder Type | Time to Vent min | Total Time of Test min | Pressure | Comments |
|---|---|---|---|---|
| Aluminium (Grundy 13 kg) | 1.5 | 1.95 | 20.5 (after 1.1 min) | Violent venting after 1.5 min. Bottle exploded after 1.95 min. Fireball about 8 m wide. |
| Steel (Shell Butagas 25 kg) | 1.83 | 7.0 | 26 (after 2.3 min) | Pressure relief valve opens after 1.83 min. Violent venting for about 7 min until bottle empty |
| Composite 2.0 mm | 1.8* | 3.3 | 4.89 (after 1.7 mm) | Pressure relief valve setting for all composite bottles was 24 bar. The PRV was never activated. Pressures are low and rise gradually. An inherent fail-safe mechanism operates. |
| 3.5 mm | 3.3* | 13.3 | 5.5 (after 5 min) | |
| 5.0 mm | 1.7* | 25.0 | 8.5 (after 5 min) | |

Note:
*Composite bottles do not vent. These times are for commencement of weight loss.

TABLE 1

STAGE ONE PROTOTYPES DETAILS OF CYLINDER WEIGHTS, LAY-UP STRUCTURE AND THICKNESSES

| Cylinder Number | Resin System | Liner Weight kg | Total Weight kg | Composite Weight kg | No of layers of fibres Hoop | No of layers of fibres Axial | Nominal Total Wall Thickness mm | Actual Thickness mm Total Hoop + Axial | Actual Thickness mm Axial |
|---|---|---|---|---|---|---|---|---|---|
| 1 | Polyester A283/270 | 2.154 | 2.946 | 0.792 | — | — | — | 1.0 | 0.25 |
| 2 | Polyester A283/270 | 2.155 | 3.170 | 1.015 | 4 | 2 | 2.0 | 1.32 | 0.56 |
| 3 | Polyester A283/270 | 2.165 | 3.160 | 0.995 | 4 | 2 | 2.0 | 1.4 | — |
| 4 | Polyester A283/270 | 2.170 | 3.165 | 0.995 | 4 | 2 | 2.0 | — | — |
| 5 | Polyester A283/270 | 2.162 | 3.071 | 0.909 | 4 | 2 | 2.0 | — | — |
| 6 | Polyester A283/270 | 2.166 | 4.060 | 1.895 | 8 | 4 | 3.5 | 2.55 | 1.0 |
| 7 | Epoxy 828 | 2.15 | 3.840 | 1.690 | 8 | 4 | 3.5 | 2.16 | 1.0 |
| 8 | Polyester A283/270 | 2.157 | 4.717 | 2.560 | 10 | 6 | 5.0 | 3.43 | 1.4 |

TABLE 2

STAGE TWO PROTOTYPES DETAILS OF CYLINDER WEIGHTS, LAY-UP STRUCTURE AND THICKNESSES

| Cylinder Number | Resin System | Liner Weight kg | Total Weight kg | Composite Weight kg | No of layers of fibres Hoop | No of layers of fibres Axial | Nominal Total Wall Thickness mm | Actual Thickness mm Total Hoop + Axial | Actual Thickness mm Axial |
|---|---|---|---|---|---|---|---|---|---|
| 9 | Polyester A283/270 | 2.158 | 6.250 | 4.092 | 10 | 6 | 5.0 | 5.33 | 2.1 |
| 10 | Polyester A283/270 | 2.202 | 4.659 | 2.457 | 6 | 4 | 3.5 | 3.10 | 1.28 |
| 11 | Polyester A283/270 | 2.149 | 3.618 | 1.469 | 4 | 2 | 2.0 | 2.6 | 1.4 |
| 12 | Polyester A283/270 | 2.170 | 6.225 | 4.055 | 10 | 6 | 5.0 | — | — |
| 13 | Polyester A283/270 | 2.174 | 6.200 | 4.027 | 10 | 6 | 5.0 | 5.22 | 2.37 |
| 14 | Polyester A283/270 | 2.132 | 6.175 | 4.044 | 10 | 6 | 5.0 | 5.07 | 2.32 |
| 15 | Polyester A283/270 | 2.122 | 4.690 | 2.568 | 6 | 4 | 3.5 | — | — |
| 16 | Polyester A283/270 | 2.172 | 4.786 | 2.615 | 6 | 4 | 3.5 | 3.13 | 1.62 |
| 17 | Polyester A283/270 | 2.146 | 4.728 | 2.583 | 6 | 4 | 3.5 | 3.23 | 1.71 |
| 18 | Polyester A283/270 | 2.085 | 3.529 | 1.444 | 4 | 2 | 2.0 | — | — |
| 19 | Polyester A283/270 | 2.046 | 3.496 | 1.450 | 4 | 2 | 2.0 | 2.24 | 0.83 |
| 20 | Polyester A283/270 | 1.972 | 3.401 | 1.450 | 4 | 2 | 2.0 | 1.98 | 0.83 |
| 21 | Polyester A283/270 | 2.049 | 3.530 | 1.481 | 4 | 2 | 2.0 | — | — |
| 22 | Phenolic J2018 | 2.075 | 3.568 | 1.584 | 4 | 2 | 2.0 | 2.26 | 1.0 |
| 23 | Polyester A283/270 + 1% carbon black | 2.051 | 4.642 | 2.591 | 6 | 4 | 3.5 | — | — |

TABLE 4

RESULTS OF BURST PRESSURE TESTING

| Cylinder Number | Nominal Wall Thickness mm | Actual Wall Thickness mm Total Hoop + Axial | Actual Wall Thickness mm Axial | Glass Content % wt Hoop | Glass Content % wt Axial | Ratio of Glass Content Hoop:Axial | Failure Pressures MPa (psi) | Failure Mode |
|---|---|---|---|---|---|---|---|---|
| 1 | 2.0 | 1.0 | 0.25 | 68.3 H + A | 68.4 | — | 3.31 (480) | Circumferential split in top dome |
| 2 | 2.0 | 1.32 | 0.56 | — | — | — | 4.86 (705) | Circumferential split in bottom dome |

TABLE 4-continued

RESULTS OF BURST PRESSURE TESTING

| Cylinder Number | Nominal Wall Thickness mm | Actual Wall Thickness mm Total Hoop + Axial | Axial | Glass Content % wt Hoop | Axial | Ratio of Glass Content Hoop:Axial | Failure Pressures MPa (psi) | Failure Mode |
|---|---|---|---|---|---|---|---|---|
| 3 | 2.0 | 1.4 | — | 59.34 | 40.66 | 1.46 | 4.28 (620) | Hoop windings unwrapped at centre of cylindrical section |
| 6 | 3.5 | 2.55 | 1.0 | 70.7 H + A | 66.0 | — | 6.76 (980) | Circumferential split in bottom dome |
| 7 | 3.5 | 2.16 | 1.0 | 69.4 H + A | 68.9 | — | 6.14 (890) | Circumferential split in bottom dome |
| 8 | 5.0 | 3.43 | 1.4 | 76.3 H + A | 69.6 | — | 6.41 (930) | Hoop windings unwrapped at bottom of cylindrical section |
| 9 | 5.0 | 5.33 | 2.1 | 62.96 | 37.03 | 1.70 | 13.14 (1905) | Circumferential split in bottom dome |
| 10 | 3.5 | 3.1 | 1.28 | 59.05 | 40.64 | 1.45 | 9.52 (1380) | Hoop windings unwrapped at bottom of cylindrical section |
| 11 | 2.0 | 2.6 | 1.4 | 63.44 | 36.55 | 1.74 | 7.03 (1020) | Circumferential split in top dome |
| 12 | 2.0 | 2.26 | 1.0 | 66.39 | 33.60 | 1.98 | 4.97 (720) | Circumferential split in top dome |

Notes
Cylinders 3, 9, 10, 11 glass fibre proportions measured in cylindrical section.
For others total glass fibre fractions measured in cylindrical section (H + A) and dome (axial).

I claim:

1. A container for the storage and transportation of pressurised fluids and having a discharge opening, said container comprising:

a thermoplastic inner liner which opens into said discharge opening and which is stable and impervious to the fluid to be contained therein up to a predetermined temperature but is fluid-pervious above said temperature, a portion of said inner liner forming a fusible plug which is fluid-pervious above said temperature and which is exposed to the atmosphere when said discharge opening is closed and said container is subjected to at least said temperature and an outer layer of an insulating fire resistant material encasing the inner liner but without covering said fusible plug so that above said temperature said fluid can pass through said plug to the atmosphere without passing through said outer layer.

2. The container of claim 1 wherein the fusible plug portion is partially covered by a protective collar.

3. The container of claim 1 or 2 wherein the temperature is 300° C.

4. The container of claim 3 wherein the inner liner is either blow-moulded or rotational-moulded.

5. The container of claim 4 wherein the container is cylindrical and contains a neck portion adapted to receive a discharge nozzle, the neck portion being integral with the inner liner and forming the fusible plug portion.

6. The container of claim 4 wherein the inner liner is selected from polyethylene, polyethylene terephthalate, polypropylene, polyvinylchloride or polyvinyllidiene chloride.

7. The container of claim 6 wherein the outer layer is selected from a carbon fibre, a polyamide fibre, a glass fibre, a glass reinforced polyester fibre, a glass reinforced phenolic fibre or a glass reinforced epoxy resin.

8. A container for the storage and transportation of pressurized fluids, and having a discharge opening said container having a cylindrical portion and comprising a thermoplastic inner liner which is stable and impervious to the fluid to be contained therein up to a predetermined temperature but is fluid-pervious above said temperature and an outer layer of an insulating fire resistant material encasing the inner liner, characterised in that (a) said inner liner is blow-moulded or rotational-moulded and opens into said discharge opening, a portion of said inner liner forming a fusible plug which is fluid-pervious above said temperature and which is exposed to the atmosphere when said discharge opening is closed and said container is subjected to at least said temperature, (b) said insulating outer layer is formed on the inner liner in a manner to expose said fusible plug portion, and (c) said insulating outer layer comprises at least two sets of glass fibre reinforced fibrous windings substantially covering the surface of the inner liner but without covering said fusible plug so that above said temperature, said fluid can pass through said plug to the atmosphere without passing through said outer layer, said two sets comprising a first axial set wound in planes substantially parallel to or at a slight angle to the axis of the inner liner and a second hoop set wound circumferentially in planes substantially normal to the axis of the inner liner, the second hoop set overlying the first axial set at least along the cylindrical portion of said inner liner.

9. The container of claim 8 wherein the fusible plug portion is partially covered by a protective collar.

10. The container of claim 9 wherein the fusible plug portion is located at a dome end of the container.

11. The container of claim 10 wherein the first axial set is wound at an angle of not greater than 20 degrees from the longitudinal axis of the container.

12. A container for the storage and transportation of pressurised fluids and having a discharge opening, said container having a cylindrical portion and comprising a thermoplastic inner liner which is stable and impervious to the fluid to be contained therein up to a predetermined temperature but is fluid-pervious above said temperature and an outer layer of an insulating fire resistant material encasing the inner liner, characterised in that (a) said inner liner is blow-moulded or rotational-moulded and opens into said discharge opening, a portion of said inner liner forming a fusible plug which is fluid-pervious above said temperature and which is exposed to the atmosphere when said container is subjected to at least said temperature, (b) said insulating outer layer is formed on the inner liner in a manner to expose said fusible plug portion, and
(c) said insulating outer layer comprises at least two sets of fibre reinforced fibrous windings substantially covering the surface of the inner liner but without covering said fusible plug so that above said temperature, said fluid can pass through said plug to the atmosphere without passing through said outer layer, said two sets comprising a first axial set wound in planes substantially parallel to or at a slight angle to the axis of the inner liner and a second hoop set wound circumferentially in planes substantially normal to the axis of the inner liner, the second hoop set overlying the first axial set at least along the cylindrical portion of said inner liner.

13. The container of claim 12 wherein the weight ratio of the hoop set to the axial set is in the range from 0.5 to 1 to 2 to 1.

14. The container of claim 12 wherein the weight ratio of the hoop set to the axial set is in the range from 1 to 1 to 1.7 to 1.

15. The container of claim 12 wherein the weight ratio of the hoop set to the axial set is in the range from 1.2 to 1 to 1.6 to 1.

16. The container of claim 12 wherein said fibre is selected from carbon fibre, a polyamide fibre, a glass fibre, a glass reinforced polyester fibre, a glass reinforced phenolic fibre and a glass fibre reinforced by epoxy resin.

17. The container of claim 12 wherein said inner layer is continuous and forms a fluid tight container below said temperature except for a discharge opening at one end thereof.

* * * * *